US008185404B1

(12) United States Patent
McDaniel et al.

(10) Patent No.: US 8,185,404 B1
(45) Date of Patent: May 22, 2012

(54) SYSTEM AND METHOD FOR TRACKING CURRENCY AT A SELF-CHECKOUT STATION

(75) Inventors: Tina Mac McDaniel, Suwanee, GA (US); Robert F. Sadler, Cumming, GA (US)

(73) Assignee: NCR Corporation, Duluth, GA (US)

( * ) Notice: Subject to any disclaimer, the term of this patent is extended or adjusted under 35 U.S.C. 154(b) by 1972 days.

(21) Appl. No.: 10/179,063

(22) Filed: Jun. 25, 2002

(51) Int. Cl.
*G06Q 40/00* (2006.01)

(52) U.S. Cl. .......................................................... 705/1

(58) Field of Classification Search .................... 705/16, 705/1
See application file for complete search history.

(56) References Cited

U.S. PATENT DOCUMENTS

| | | | |
|---|---|---|---|
| 4,620,087 A * | 10/1986 | Aizaki | 235/379 |
| 5,366,404 A * | 11/1994 | Jones | 453/2 |
| 5,494,136 A * | 2/1996 | Humble | 186/61 |
| 5,659,845 A * | 8/1997 | Krist et al. | 399/79 |
| 5,907,603 A * | 5/1999 | Gallagher et al. | 379/133 |
| 6,386,323 B1 * | 5/2002 | Ramachandran et al. | 186/36 |
| 6,446,086 B1 * | 9/2002 | Bartlett et al. | 707/200 |
| 6,550,582 B2 * | 4/2003 | Addy et al. | 186/61 |
| 6,550,671 B1 * | 4/2003 | Brown et al. | 235/379 |
| 6,837,428 B2 * | 1/2005 | Lee et al. | 235/383 |
| 6,857,505 B1 * | 2/2005 | Mason et al. | 186/59 |
| 6,990,463 B2 * | 1/2006 | Walter et al. | 705/16 |
| 2003/0003997 A1 * | 1/2003 | Vuong et al. | 463/42 |
| 2003/0200163 A1 * | 10/2003 | O'Riordan et al. | 705/35 |

OTHER PUBLICATIONS

Platform Computing Corporation (1994-1998), Managing LSF Batch, pp. 1-19, ( www.zdv.uni-mainz.de/cms-extern/lsf/lsf3.2/html/admin/03-manag.htm).*
Platform Computing Corporation (1994-1998), Managing LSF Batch, pp. 1-19, ( www.zdv.uni-maonz.de/cms-extern/lsf/lsf3.2/html/admin/03-manag.htm).*
Oracle: Maintaining Accounting Periods, Feb. 1, 2001, pp. 1-3.*

* cited by examiner

*Primary Examiner* — Bijendra K Shrestha
(74) *Attorney, Agent, or Firm* — Paul W. Martin; Paul J. Maginot; Harden E. Stevens, III

(57) ABSTRACT

A system and method for tracking currency in a self-checkout station in one embodiment comprises a currency acceptor for collecting cash payment elements and determining the denominations of the collected cash payment elements, a cash dispenser for dispensing cash payment elements, a denomination counter for counting units of collected and dispensed cash payment elements, a processor, a memory, programmed instructions stored in the memory which, when executed by the processor, close an open accounting log based upon a received accounting period signal, and data storage for storing the number of denomination units counted for collected cash payment elements.

20 Claims, 6 Drawing Sheets

FIG. 4

| | | |
|---|---|---|
| Total Sales: $1186.46 | Debit Cash Back: $120 | |
| Credit: $800.70 | | |
| Debit: $200 | | |
| Cash: $185.76 | | |
| Cash Received Total: $244.28 | Cash Dispensed Total: $178.52 | Purged Bin Total: $26.00 |
| Total Notes: $243.00 | Total Notes: $176.00 | |
| Total Coins: $1.28 | Total Coins: $2.52 | |
| Number of $20: 6 | Number of $20: 8 | Number of $20: 0 |
| Number of $10: 10 | Number of $10: 1 | Number of $10: 1 |
| Number of $5: 2 | Number of $5: 1 | Number of $5: 0 |
| Number of $1: 13 | Number of $1: 1 | Number of $1: 16 |
| Number of 25 cents: 4 | Number of 25 cents: 5 | |
| Number of 10 cents: 2 | Number of 10 cents: 4 | |
| Number of 5 cents: 1 | Number of 5 cents: 11 | |
| Number of 1 cent: 3 | Number of 1 cent: 32 | |

Total Cash on Hand: $565.76
(Sum of total left in the dispensers, purged bin and cash acceptors)

Total Cash left in the Dispensers: $295.48
Note Dispensers Total: $224.00
Coin Dispensers Total: $ 71.48

Number of $20: 5
Number of $10: 5
Number of $5: 6
Number of $1: 44
Number of 25 cents: 200
Number of 10 cents: 100
Number of 5 cents: 200
Number of 1 cent: 148

SYSTEM AND METHOD FOR TRACKING CURRENCY AT A SELF-CHECKOUT STATION

FIELD OF THE INVENTION

This invention relates generally to methods and systems for tracking transactions at a self-checkout station and, more particularly, to methods and systems for balancing funds at self-checkout stations.

BACKGROUND OF THE INVENTION

Self-checkout stations at grocery stores and other retail stores are well known. The stations permit a consumer to scan items for purchase so the station may identify the items and a corresponding price When the consumer indicates all items for purchase have been presented to the terminal, a sub-total is accumulated, any taxes and discounts are computed, and a total amount due is displayed for the consumer. The station then allows the consumer to select a payment method by presenting menu selections to the consumer. If an electronic payment method is selected funds are transferred from the account corresponding to a token submitted by the consumer to the retailer's account. Upon confirmation of payment, the items are released to the consumer. Alternatively, the consumer may select a cash payment option and feed paper currency and coinage to the self-checkout station. Any change required from the amount submitted may then be calculated and dispensed to the consumer before releasing the items to the consumer.

A self-checkout station typically includes a terminal, a scanner and scales for reading unit price codes (UPC) and determining item weight, a cashier keypad and display, a POS terminal for payment entry, a receipt printer, a change unit, and a checkout area for holding items once they have been scanned. The terminal also includes a display, a processor, memory, programmed instructions, and data peripherals to control the operations of the station. The programmed instructions may contain modules that query for item prices, computing totals and performing other functions related to the purchase of items through a self-checkout station. Most checkout stations also include currency readers for verifying the denominations of currency submitted to the terminal for payment of items when the cash payment option is selected. Likewise, a coinage reader provides the same function for coin verification. The currency and coinage readers are well-known components such as those used in vending machines to reduce the risk of loss that occurs from accepting counterfeit currency and coins.

Previously known self-checkout stations do not synchronize the cash collections and disbursements with accounting periods for a store. Instead, manual accounting was used to count the currency and coins collected by a terminal and to count the remaining supply of currency and coins for disbursements. These figures were then manually recorded and provided to accounting personnel for inclusion in the store's accounting figures for a period. Such manual accounting has a number of drawbacks. For one, manual counting may result in loss from theft by store personnel counting the collected funds or by pilfering the change supplies. Likewise, personnel loading the change supplies at terminal initialization for an operating period may take cash. Such losses are possible because the terminal does not record currency exchanges for transactions.

Another problem arising from manual counting is the lack of synchronization with the store's accounting periods unless personnel service the terminal at times corresponding to the store accounting periods. Consequently, loans made to terminals for the purpose of provisioning change supplies cannot be included in the fund accounting for a store until the self-checkout stations are serviced and the currency collected. Subsequent store accounting periods must include self-checkout station fund accounting for transactions that occurred during a previous store accounting period.

What is needed is a way of synchronizing the transaction totals of a self-checkout station with the accounting periods for a store.

What is needed is a way of tracking currency and coinage collected and disbursed by a self-checkout station so theft losses during terminal servicing may be reduced.

What is needed is a way of associating currency collected with its corresponding transaction for more accurate currency tracking and theft detection that may occur at a self-checkout station.

What is needed is a way of tracking currency within a self-checkout station so that funds within the terminal may be accounted during a store accounting period without requiring servicing of the terminal.

SUMMARY OF THE INVENTION

The above-noted limitations of previously known systems and methods for transaction accounting at checkout stations have been overcome by a system and method that operate in accordance with the principles of the present invention. The system of the present invention comprises a currency acceptor for collecting cash payment elements and determining the denominations of the collected cash payment elements, a denomination counter for counting units of determined cash payment elements, and data storage for storing the count of the denomination units. By storing a count of the denomination units collected by the currency acceptor, the system of the present invention provides a record for accounting for the received funds in a self-checkout station. In this specification, the term "cash payment element" refers to units of paper currency and units of coinage that are recognized as legal tender in a nation's economy.

In the system of the present invention, an accounting period synchronizer receives an accounting period signal so an open accounting log may be closed and a next accounting log may be opened. Receipt of this signal and the closing and opening of accounting logs in the self-checkout station permits the collected cash payment elements to be allocated to different accounting periods without requiring servicing of the self-checkout station. The accounting period signal may be received from a server for the store or other establishment in which the self-checkout station is located or it may be received from a switch that may be manually activated to synchronize accounting period logs.

Preferably, the system of the present invention includes a transaction generator for generating a transaction identifier for each consumer transaction. A transaction is comprised of a consumer identifying items to be purchased through the components of the self-checkout terminal, presenting payment for the identified items, the presented payment being accepted for release of the items to the consumer. Once presented payment is accepted, the self-checkout station may identify items for another transaction and evaluate the presented payment for this transaction. The transaction generator generates an identifier that may be associated with the count of the denomination units that were counted for the cash payment elements presented for payment of items in a transaction. Using this data, an accounting report generator may generate a report for an accounting period that identifies each transaction and the cash payment elements collected for payment of the transaction. If the collected cash payment elements are collected and maintained in sequential order, such as stacked paper currency, the collected cash payment elements may be associated with a particular transaction in an accounting report. Thus, counterfeit or other bogus currency units may be associated with a particular transaction and, if a customer token, such as a preferred customer card, is used during the transaction, a possible perpetrator may be identified. Alternatively, if the consumer area of a self-checkout station is monitored by a camera and the images stored, the association of a bogus payment element with a particular transaction identifier may be used to select images from the image data files for identification of a possible perpetrator.

The system of the present invention may also include a cash dispenser for dispensing cash payment elements. These cash payment elements may be dispensed in request for funds by consumer through an account accessed by a debit card or the like or the elements may be dispensed as change for tendered payment. The denomination counter of the present invention may be coupled to the cash dispenser to count the units of denominations dispensed by the cash dispenser and the resulting count may be stored in data storage. Preferably, the transaction generator associates the count of the denomination units with the transaction identifier for storage in the data storage. The accounting generator may use these data to generate accounting reports that list transactions and the count of the units dispensed for each transaction.

The method of the present invention comprises collecting cash payment elements and determining the denominations of the collected cash payment elements, counting units of determined cash payment elements, and storing the count of the denomination units. By storing a count of the denomination units collected by the currency acceptor, the system of the present invention provides a record for accounting for the received funds in a self-checkout station.

In the method of the present invention, receipt of an accounting period signal causes an open accounting log to be closed and a next accounting log to be opened. Receipt of this signal and the closing and opening of accounting logs in the self-checkout station permit the collected cash payment elements to be allocated to different accounting periods without requiring servicing of the self-checkout station. The accounting period signal may be received from a server for the store or other establishment in which the self-checkout station is located or it may be received from a switch that may be manually activated to synchronize accounting period logs.

Preferably, the method of the present invention includes generating a transaction identifier for each consumer transaction that may be associated with the count of the denomination units that were counted for the cash payment elements presented for payment of items in a transaction. Using this data, a report may be generated for an accounting period that identifies each transaction and the cash payment elements collected for payment of the transaction. The correlation of the collected cash payment elements and the transaction data may be used as discussed above to identify possible perpetrators of fraudulent activity.

The method of the present invention may also include dispensing cash payment elements. These cash payment elements may be dispensed in request for funds by consumer through an account accessed by a debit card or the like or the elements may be dispensed as change for tendered payment. The denominational units of the dispensed elements may be counted and the resulting count may be stored in data storage. Preferably, the count of the denomination units is associated with the transaction identifier for storage in the data storage. Accounting reports may then be generated using these data to list transactions and the count of the units dispensed for each transaction.

What is needed is a way of synchronizing the transaction totals of a self-checkout station with the accounting periods for a store.

It is an object of the present invention to track currency and coinage collected and disbursed by a self-checkout station so theft losses during terminal servicing may be reduced.

It is an object of the present invention to associate collected currency and coinage elements with a corresponding transaction for more accurate currency tracking and theft detection that may occur at a self-checkout station.

It is an object of the present invention to track currency within a self-checkout station so that funds within the terminal may be accounted during a store accounting period without requiring servicing of the terminal.

These and other advantages and features of the present invention may be discerned from reviewing the accompanying drawings and the detailed description of the invention.

BRIEF DESCRIPTION OF THE DRAWINGS

The present invention may take form in various system and method components and arrangement of system and method components. The drawings are only for purposes of illustrating an exemplary embodiment and are not to be construed as limiting the invention.

FIG. 4 is an exemplary accounting report of cash totals for transactions kept in a transaction log; and FIG. 5 is an exemplary accounting report listing the number of denomination units in the acceptor and dispenser of a self-checkout station.

DETAILED DESCRIPTION OF THE INVENTION

Figure 1:
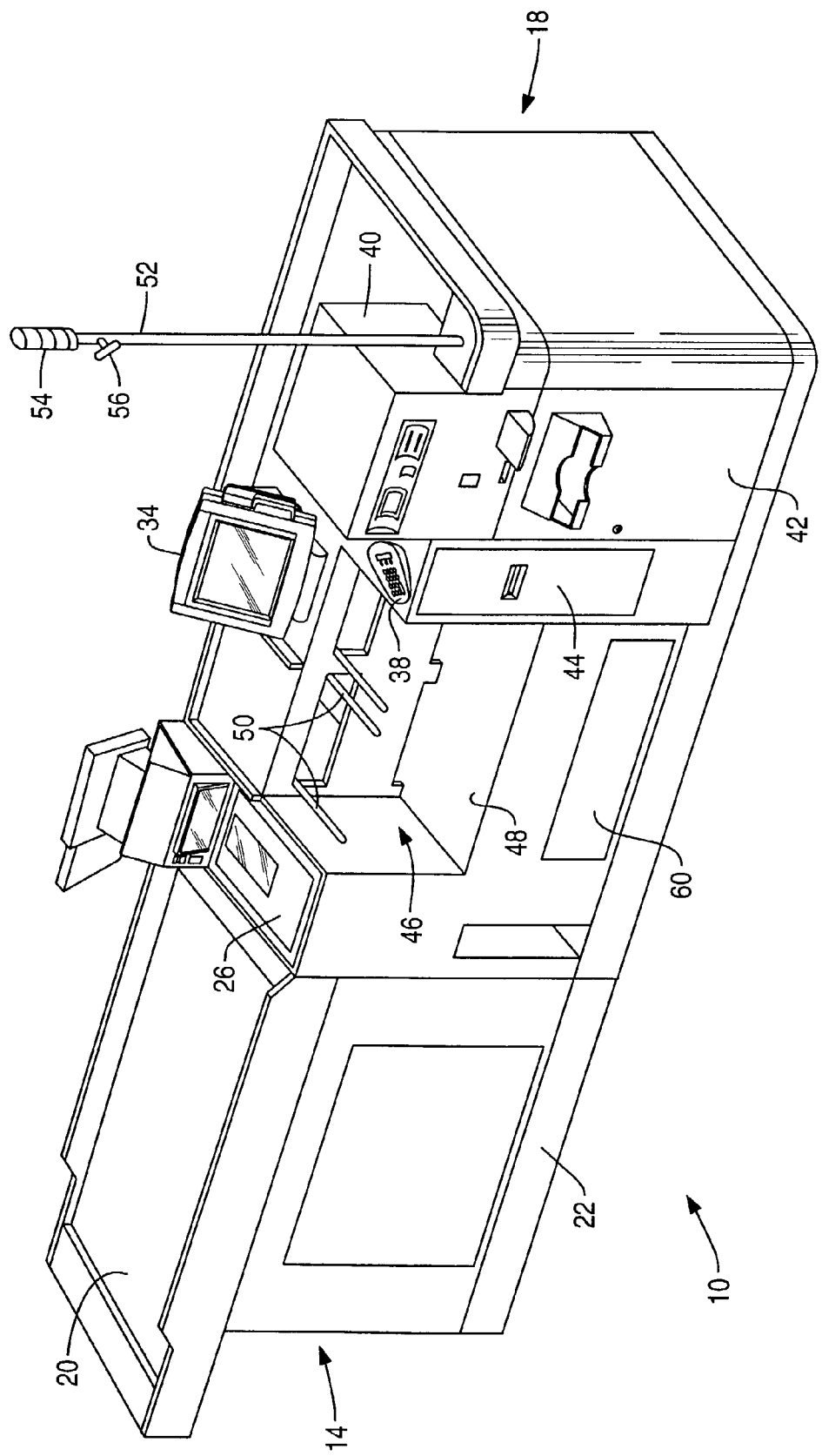
FIG. 1 depicts a self-checkout station in which the present invention may be used.

A self-checkout station used with the system and method of the present invention is shown in FIG. 1. Checkout station 10 may include a feeder unit 14 and a checkstand 18. Feeder unit 14 includes a feeder belt 20 and housing 22 for the motor and control circuitry that operates feeder belt 20. Feeder unit 14 is movably coupled to checkstand 18 so the feeder belt may be aligned with scanner/scale unit 26. Checkstand 18 includes scanner/scale unit 26, consumer terminal 34, a payment terminal 38 for entry of payment data, and receipt printer 44. Scanner/scale unit 26 uses a laser shining on a glass or other transparent platen to input data from bar codes applied to products or packages. Unit 26 may also include a scale for measuring the weight of items that are sold on a price/unit of weight basis. Consumer terminal 34 displays item data as it is entered through scanner/scale unit 26. Payment terminal 38 may be any known POS terminal that incorporates a keypad and card reader to support credit card, debit card, and other payment methods. Receipt printer 44 provides a consumer with a receipt itemizing the items purchased and the method of payment.

Separating receipt printer 44 and scanner/scale unit 26 is a bagwell 46 having a security scale 48 for its floor. Bags for storing items that consumers have scanned and weighed are hung from hanging rails 50 in bagwell 46. Security scale 48 uses item weight data derived from scanner/scale 26 or a database using a scanned unit product code (UPC) to verify that only the items scanned are placed on the security scale. Security application programs operating within terminal 34 monitor security scale 48 to determine whether items not scanned have been added to the security scale area. An anomalous condition that requires investigation may be signaled by lighting a warning or alert light color within the tri-color indicator mounted at the terminal end of indicator pole 52 of checkstand 18. Indicator pole 52 may also have mounted thereon a security camera for providing a video signal to a security officer surveillance area or to some storage media. A database, disk drive, or other computer peripheral required for station operation may be housed within peripheral tray 60 located within checkstand 18. Checkstand 18 also includes currency acceptor 40 for receiving units of paper currency and coins from a consumer as payment for a transaction while cash dispenser 42 returns change to a consumer or funds requested from a debit account or the like.

As shown in FIG. 1, a consumer may place items on feeder belt 20 and belt 20 is driven to bring items to the end of belt 20 where a shut-off mechanism stops belt 20. The consumer may commence a transaction by removing items from belt 20 and moving them, one at a time, over scanner/scale 26 for item product data retrieval and/or weighing. The scanned items may then be placed in bags on security scale 48. Once all of the items are scanned, a consumer may provide payment through payment terminal 38 or currency acceptor 40, receive change from dispenser 44, and a receipt from printer 44. The consumer may then remove the bags from security scale 48 and leave station 10 to complete a transaction.

Figure 2:
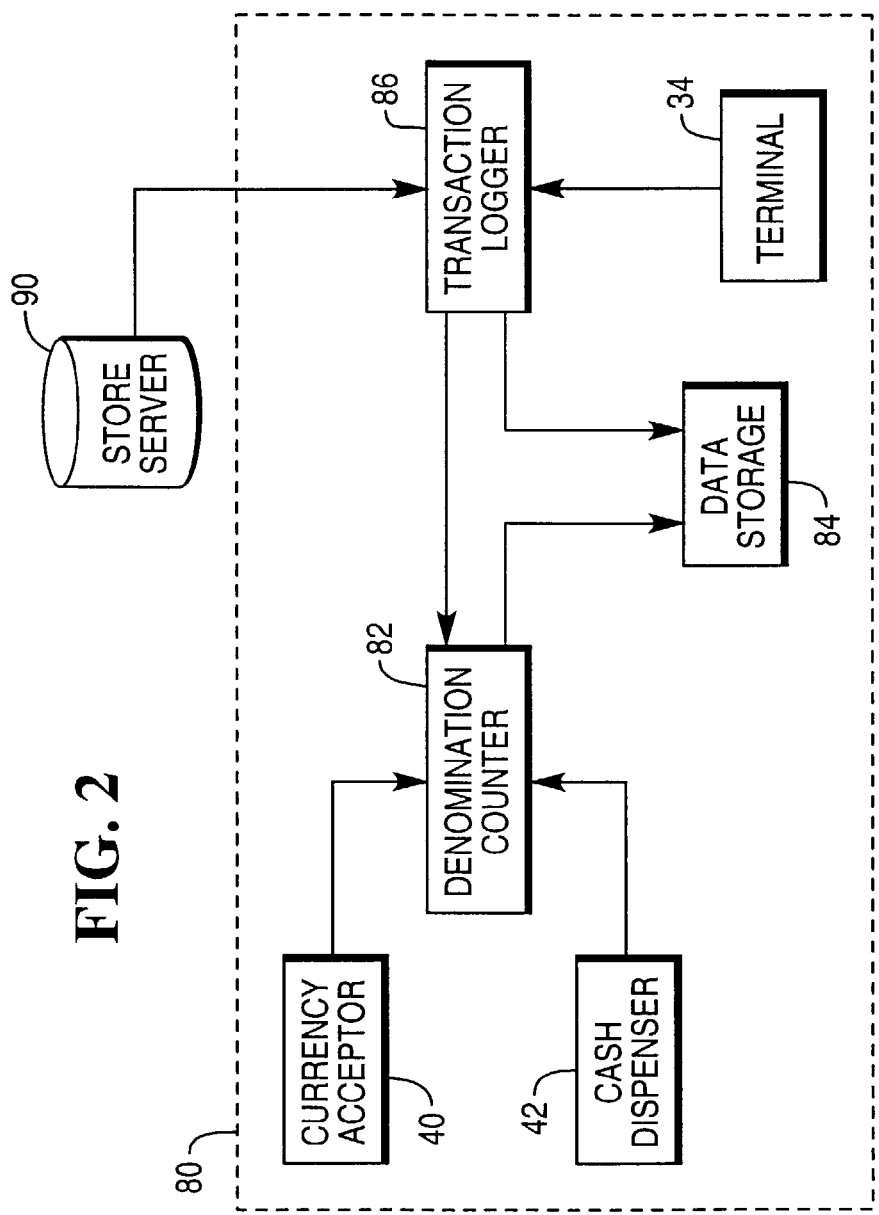
FIG. 2 is a block diagram of a system incorporation the principles of the present invention.

In one embodiment of the present invention, a currency tracking program may reside in the computer that controls terminal operation for the checkout stand. The currency tracking program includes components shown in the block diagram of FIG. 2. System 80 is coupled to store server 90 and includes terminal 34, currency acceptor 40, cash dispenser 42, denomination counter 82, data storage 84, and transaction logger 86. Terminal 34, currency acceptor 40 and cash dispenser 42 are components in self-checkout station 10. Terminal 34 provides signals regarding the various stages of a transaction. Currency acceptor 40 identifies the denomination of a cash payment element as it is verified and accepted by currency acceptor 42. Cash dispenser 42 identifies the denomination of a cash payment element as it is dispensed. Denomination counter 82 receives the identifications of the units collected and dispensed by acceptor 40 and dispenser 42 and accumulates them. Counter 82 is coupled to terminal 34 through logger 86 to receive signals regarding the status of a transaction. For example, once terminal 34 determines sufficient cash payment elements have been entered to pay for the items of a transaction, a payment tendered signal may be generated for use by logger 86 and counter 82. In response to this signal, counter 82 may provide the counts of the denomination units to data storage 84. These counts may be stored in storage 84 in association with a transaction identifier generated by logger 86 if the accounting log is maintained on a transaction by transaction basis. Otherwise, an accumulated count of denominations in storage 84 may be updated by the counts accumulated by counter 82 for a transaction. Logger 86 may use the end of transaction signal from terminal 34 to end data storage associated with a transaction identifier for an ongoing transaction.

Store server 90 maintains accounting data for the establishment in which self-checkout station 10 is located. It may generate accounting period signals to mark the beginning and/or end of accounting periods for store reporting purposes. In response to this signal, logger 86 may close the currently open accounting log and identify the last transaction for that accounting period. A next accounting period is opened and subsequent transactions are associated with that accounting period.

Self-checkout stations may be coupled to store server 90 by a computer network such as a local area network (LAN). Each station includes computer software that controls the operation of a self-checkout station and communicates with store server 90. The program or programs used to implement the currency tracking and account logging system and method of the present invention may reside on the computer of a terminal 34 for a station 10 or it may be implemented on its own computer located in association with a station 10. Terminal 34 typically uses a Pentium processor with 128 MB of RAM and a 10 GB hard drive. The currency tracking and account logging software may be written with programmed instructions in any known computer language supported by and compatible with the operating system of terminal 34.

Figure 3A:
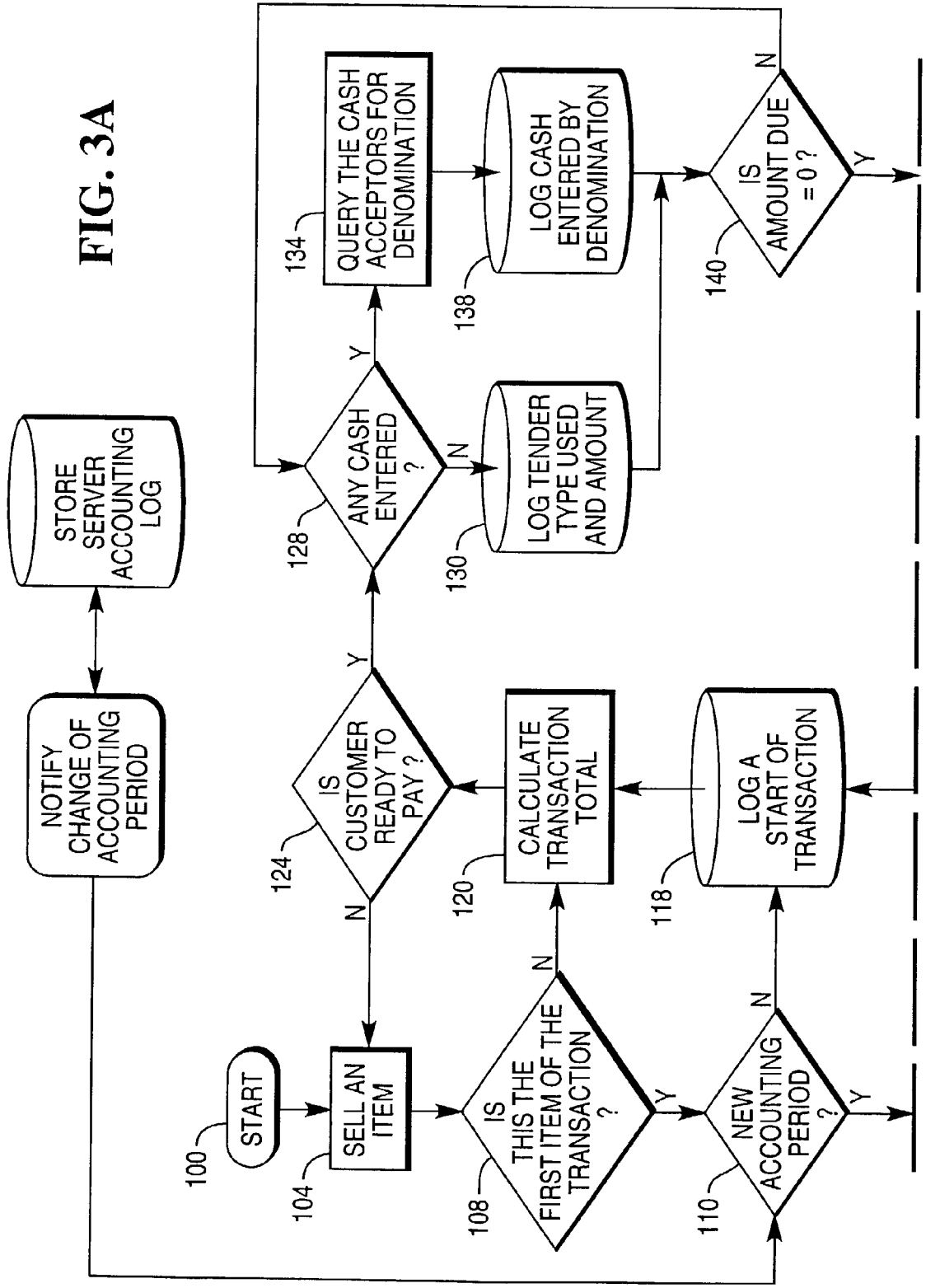
FIG. 3 is a flowchart of an exemplary method for tracking cash payment elements in the system of the present invention shown in FIG. 2.
Figure 3B:
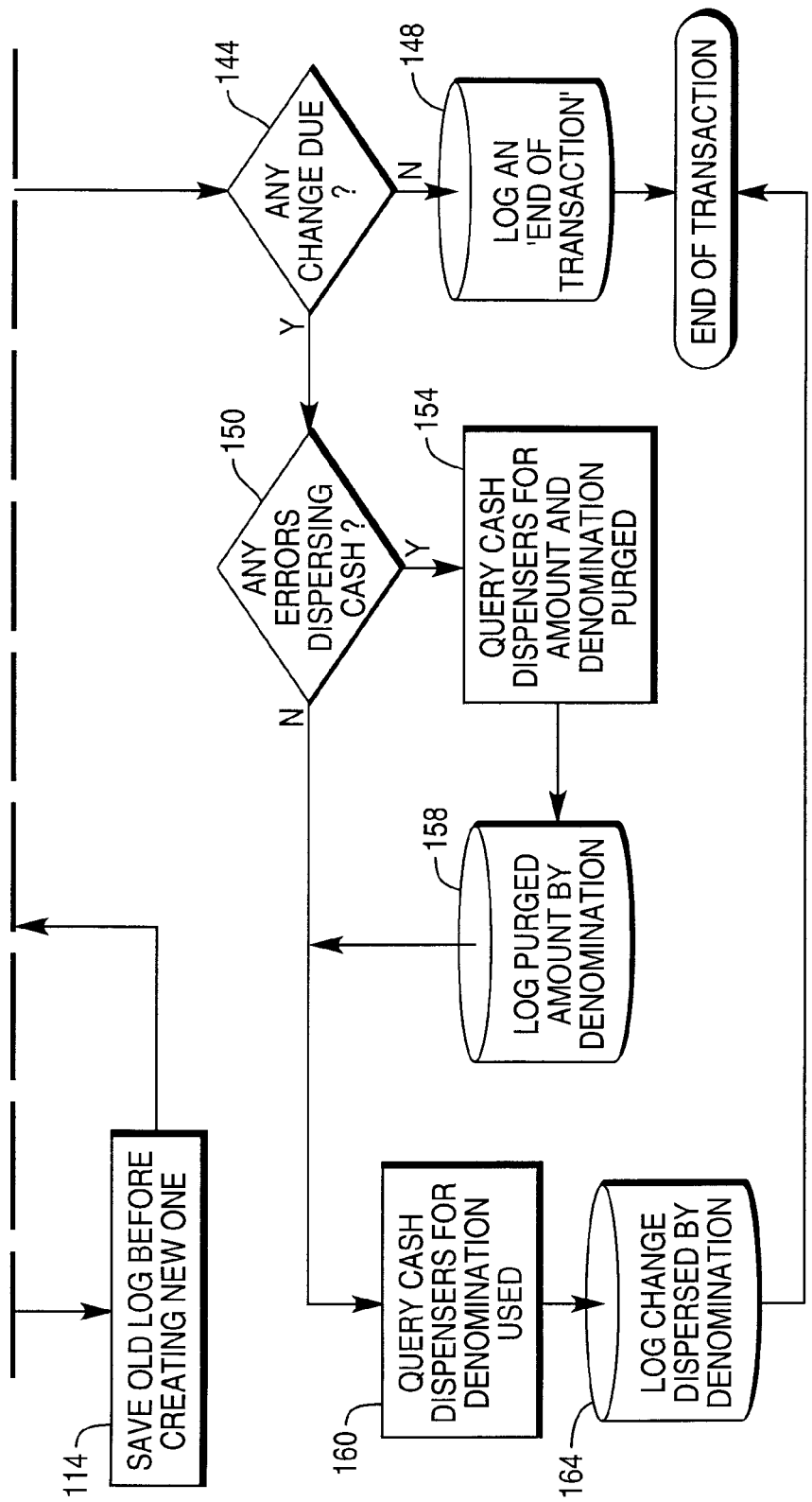

An exemplary method that may be used to implement the principles of the present invention is shown in FIG. 3. Once terminal 34 or the computer on which the currency tracking and logging software resides is initialized (block 100), a scanned item is detected (block 104). If it is the first item of a transaction (block 108), the method determines whether store server 90 has identified a new accounting period (block 110). If it has, the current accounting period is closed and a next accounting period is opened (block 114). A transaction log is then commenced (block 118). A transaction log is commenced without an accounting period close if no signal regarding accounting periods has been received from store server 90. While server 90 preferably generates the signal for identifying accounting periods, a manually activated switch at a station may generate the signal if independence of accounting periods for stations is desired.

The price data for a scanned item is added to a transaction total (block 120). The process of detecting a scanned item and updating the transaction total continues until the consumer indicates a readiness to pay (block 124). The signal indicating readiness to pay may be generated from a button of a touch screen or from depression of a keypad associated with terminal 34. The process then determines whether the consumer selected the cash payment method (block 128). If a non-cash payment method is selected, the type and amount of the tender is logged (block 130). Otherwise, denomination counter 82 receives from currency acceptor 40 the number of denomination units verified and accepted by acceptor 40 (block 134) and updates its denomination unit counters (block 138) until a sufficient amount has been entered to pay for the transaction (block 140).

If the exact amount required for payment of the transaction is tendered (block 144), the log of the current transaction is complete and stored in data storage 84 (block 148). Preferably, the count of the collected denominational units is stored in association with a transaction identifier generated by logger 86 so collected units may be correlated with a particular transaction. If the tendered amount exceeds the amount required for payment of the transaction (block 144), the process determines whether errors occurred in dispensing the change (block 150). If errors occurred, dispenser 42 is queried for the amount and number of denominational units that were purged (block 154) and this data is stored for the transaction log (block 158). For the change returned, dispenser 42 provides a count of the total and number of denominational units dispensed (block 160) and this data is stored in the transaction log (block 164).

Transaction logger 86 may also generate accounting reports or it may include one or more components for generating and sending such reports to store server 90. An exemplary report for a self-checkout station 10 using the transaction logs containing the count of the denomination units collected and dispensed is shown in FIG. 4. Heading 200 identifies the total sales in dollars processed by station 10 and this number is broken down into credit sales dollars, debit sales dollars, cash payment received, and debit cash dispensed. Column 204 of the report identifies the cash received total and the total dollar value of the paper currency received and of the coinage received. The count of the denomination units for the cash payment elements collected by acceptor 40 is also identified for the cash received. In like manner, the cash dispensed for change and debit cash is identified in column 208 while a similar breakdown is given in column 210 for the cash payment elements in the purged bin for the errors that occurred in the dispensing of cash by dispenser 42. These data may be used to identify the total cash in the acceptor 40, dispenser 42, and purged bin of a station 10 as shown in FIG. 5. The initial count of denomination units and cash total of a dispenser may be initialized during servicing of cash dispenser 42 of a station 10.

A station 10 that incorporates the system and method of the present invention may be used to establish an initial count of the units of each denomination in a cash dispenser of a station. After being placed in service, station 10 may then maintain a transaction log that counts the denomination units collected by the currency acceptor of the station and that also counts the denomination units dispensed by its cash dispenser. Cash dispensing errors are also logged. Accounting reports may be generated to identify the cash total and number of denomination units stored in the acceptor and dispenser of the station as well as accounting for the cash dispensed so all cash stored in a station at operation initialization may be tracked. The transaction log may be synchronized with the accounting periods of a store server.

While the present invention has been illustrated by the description of exemplary processes and system components, and while the various processes and components have been described in considerable detail, it is not the intention of the applicant to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A system for tracking cash payment elements for a self-checkout station, the system comprising:
    a computer server; and
    a self-checkout station in communication with the server, the station comprising:
        a currency acceptor adapted to collect cash payment elements and determine denominations for the collected cash payment elements;
        a denomination counter adapted to count units of denominations for the collected cash payment elements;
        a memory;
        a data storage;
        a processor in communication with the currency acceptor, the denomination counter, the memory and the data storage; and
        programmed instructions stored in the memory which, when executed by the processor, close an open accounting log and open a next accounting log based upon an accounting period signal received from the server where the accounting logs are stored on the data storage and comprise information about the cash payment elements accepted by the self-checkout station including the number for each denomination unit counted for the collected cash payment elements and where the accounting period signal marks the end of one financial accounting period and the beginning of another financial accounting period.

2. The system of claim 1 further including:
    a report generator for generating a report of denomination units counted for the collected cash payment elements.

3. The system of claim 1 wherein the denomination counter associates counted denomination units for cash payment elements collected for a transaction with a transaction identifier for storage in the data storage.

4. The system of claim 1 further including:
    a currency dispenser coupled to the denomination counter for counting units of denominations for cash payment elements dispensed by the currency dispenser.

5. The system of claim 4 further comprising:
    a report generator for generating a report of denomination units counted for the dispensed cash payment elements.

6. The system of claim 5 wherein the denomination counter associates counted denomination units for cash payment elements dispensed for a transaction with a transaction identifier for storage in the data storage.

7. A method implemented by a computer in a self-checkout station for tracking cash payment elements, the method comprising:
    receiving cash payment elements by a currency acceptor in the self-checkout station;
    determining denominations for the received cash payment elements;
    counting units of denominations for the received cash payment elements;
    storing the number of denomination units counted for the received cash payment elements in an open transaction log stored in a data storage on the self-checkout station;
    receiving an accounting period signal from a second computer where the accounting period signal marks the end of one financial accounting period and the beginning of another financial accounting period;
    closing the open transaction log based upon the received accounting period signal where the open transaction log comprises information about the cash payment elements received by the self-checkout station; and
    opening a next transaction log stored in the data storage on the self-checkout station based upon the received accounting period signal where the next transaction log comprises information about the cash payment elements received by the self-checkout station during the current accounting period.

8. The method of claim 7 further including:
generating a report of denomination units counted for the received cash payment elements.

9. The method of claim 7 further including:
associating counted denomination units for the cash payment elements received for a transaction with a transaction identifier for storage.

10. The method of claim 7 further including:
dispensing cash payment elements; and
counting units of denominations for dispensed cash payment elements.

11. The method of claim 10 further comprising:
generating a report of denomination units counted for the dispensed cash payment elements.

12. The method of claim 10 further including:
associating counted denomination units for cash payment elements dispensed for a transaction with a transaction identifier for storage.

13. A method implemented by a computer in a self-checkout station for tracking cash payment elements, the method comprising:
receiving cash payment elements by a currency acceptor in the self-checkout station;
determining denominations for the received cash payment elements;
counting units of denominations for the received cash payment elements;
dispensing cash payment elements from a currency dispenser;
counting units of denominations for the dispensed cash payment elements;
storing the number of denomination units counted for the received cash payment elements and for the dispensed cash payment elements in an open first transaction log stored in a data storage in the self-checkout station;
receiving from a second computer an accounting period signal where the accounting period signal marks the end of one financial accounting period and the beginning of another financial accounting period;
closing the first transaction log in response to the received accounting period signal where the first transaction log comprises information about the cash payment elements collected by and dispensed from the self-checkout station during the just ended accounting period; and
opening a second transaction log stored in the data storage in the self-checkout station based upon the received accounting period signal where the second transaction log comprises information about the cash payment elements received by and dispensed from the self-checkout station for the current accounting period.

14. The method of claim 13 further including:
generating a transaction identifier for each transaction processed by the self-checkout station; and
storing the count of denomination units for the cash payment elements received for a transaction and the count of denomination units for the cash payment elements dispensed for the transaction with the transaction identifier.

15. The method of claim 14 further including:
generating a transaction report from the count of denomination units for cash payment elements received for a plurality of transactions and from the count of denomination units for the cash payment elements dispensed for the plurality of transactions.

16. A system for tracking cash payment elements for a self-checkout station, the system comprising:
a computer server; and
a self-checkout station in communication with the server, the station comprising:
a currency acceptor adapted to collect cash payment elements and determine denominations for the collected cash payment elements;
a cash dispenser for dispensing cash payment elements;
a denomination counter adapted to count units of denominations for the cash payment elements collected by the currency acceptor and for counting units of denominations for cash payment elements dispensed by the cash dispenser;
a memory;
a data storage;
a processor in communication with the currency acceptor, the denomination counter, the memory and the data storage; and
programmed instructions stored in the memory which, when executed by the processor, close an open accounting log and open a next accounting log based upon an accounting period signal received from the server where the accounting logs are stored on the data storage and comprise information about the cash payment elements accepted by the self-checkout station including the number of denomination units counted for collected cash payment elements and for dispensed cash payment elements and where the accounting period signal marks the end of one financial accounting period and the beginning of another financial accounting period.

17. The system of claim 16 further including:
a transaction logger for generating a transaction identifier associated with the count of denomination units for the cash payment elements collected for a transaction and the count of denomination units for the cash payment elements dispensed for a transaction.

18. The system of claim 17 further including:
a transaction report generator for generating a transaction report from the count of denomination units for cash payment elements collected for a plurality of transactions and from the count of denomination units for cash payment elements dispensed for the plurality of transactions.

19. The system of claim 1, wherein the programmed instructions stored in the memory further comprise programmed instructions which, when executed by the processor:
determine if a scanned item is the first item of a transaction;
determine, for each first item of a transaction, if this is the first transaction after a new accounting period has been identified based upon the received accounting period signal; and
where opening the next accounting log includes opening the next accounting log when a first item of a first transaction after a new accounting period is identified.

20. The system of claim 19, wherein the programmed instructions stored in the memory further comprise programmed instructions which, when executed by the processor:
log the transaction in the open accounting log.

* * * * *